United States Patent
Jung (10) Patent No.: US 11,438,496 B2
(45) Date of Patent: Sep. 6, 2022

(54) MULTI-CAMERA MODULE

(71) Applicant: Samsung Electro-Mechanics Co., Ltd., Suwon-si (KR)

(72) Inventor: Han Jun Jung, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 17/223,291

(22) Filed: Apr. 6, 2021

(65) Prior Publication Data

US 2021/0409585 A1    Dec. 30, 2021

(30) Foreign Application Priority Data

Jun. 30, 2020  (KR) .......................... 10-2020-0080549

(51) Int. Cl.
  *H04N 5/225*  (2006.01)
  *H04M 1/02*  (2006.01)

(52) U.S. Cl.
  CPC ........ *H04N 5/2258* (2013.01); *H04M 1/0264* (2013.01); *H04N 5/2257* (2013.01)

(58) Field of Classification Search
  CPC ....................... H04N 5/2258; H04M 1/0264
  See application file for complete search history.

(56) References Cited

U.S. PATENT DOCUMENTS

| | | | | |
|---|---|---|---|---|
| 9,479,758 | B2* | 10/2016 | Woo | H04N 13/254 |
| 2012/0086784 | A1* | 4/2012 | Oh | G03B 35/08 348/47 |
| 2016/0205380 | A1* | 7/2016 | Inoue | H04N 5/23296 348/46 |
| 2019/0311180 | A1* | 10/2019 | Tang | H04N 5/2253 |
| 2020/0068104 | A1* | 2/2020 | Hsu | H04N 5/2253 |
| 2020/0120801 | A1* | 4/2020 | Li | H04N 5/22521 |
| 2021/0329108 | A1* | 10/2021 | Jia | H04M 1/0264 |
| 2022/0070347 | A1* | 3/2022 | Han | G02B 7/02 |

FOREIGN PATENT DOCUMENTS

| | | |
|---|---|---|
| KR | 10-0595716 B1 | 7/2006 |
| KR | 10-2015-0000655 A | 1/2015 |
| KR | 10-2017-0086927 A | 7/2017 |
| KR | 10-2017-0106185 A | 9/2017 |
| KR | 10-2019-0050021 A | 5/2019 |

\* cited by examiner

*Primary Examiner* — Anthony J Daniels
(74) *Attorney, Agent, or Firm* — NSIP Law (57) ABSTRACT

A multi-camera module includes a plurality of camera units, and a single case coupled to the plurality of camera units, wherein the case includes an upper surface portion surrounding an upper portion of the plurality of camera units, and wherein the upper surface portion includes a groove, the groove having different depths in accordance with a position corresponding to the plurality of camera units.

19 Claims, 12 Drawing Sheets

MULTI-CAMERA MODULE

CROSS-REFERENCE TO RELATED APPLICATIONS

This application claims the benefit under 35 USC 119(a) of Korean Patent Application No. 10-2020-0080549 filed on Jun. 30, 2020, in the Korean Intellectual Property Office, the entire disclosure of which is incorporated herein by reference for all purposes.

BACKGROUND

1. Field

The following description relates to a dual camera module and a portable electronic device.

2. Description of the Background

Camera modules have been used in portable electronic devices such as smartphones, tablet personal computers (PCs), notebook computers, and the like.

Further, a structure in which a plurality of camera modules are arranged in a portable electronic device has been suggested for various effects that may be impractical with a single camera module.

In this case, a case for connecting the plurality of camera modules can be provided to configure the plurality of camera modules as a single module. However, a problem in attaching/detaching the case to/from the plurality of camera modules may be encountered.

For example, an unexpected defect may occur during a manufacturing process, which may require a repair, and this requires detachment of the case.

However, it is difficult to detach the case mounted with the plurality of camera modules from the plurality of camera modules, and even when detached, one or more camera modules of the plurality of camera modules may be broken.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a multi-camera module includes a plurality of camera units, and a single case coupled to the plurality of camera units, wherein the case includes an upper surface portion surrounding an upper portion of the plurality of camera units, and wherein the upper surface portion includes a groove, the groove having different depths in accordance with a position corresponding to the plurality of camera units.

A thickness of the upper surface portion at a position in which the groove is disposed may be less than thicknesses of other positions of the upper surface portion.

The upper surface portion may have the same thickness at the position where the groove is disposed.

The groove may be located in a lower surface of the upper surface portion.

The groove may be located in an upper surface of the upper surface portion.

The plurality of camera units may include a first camera unit and a second camera unit, wherein the upper surface portion may include a first upper surface portion surrounding an upper portion of the first camera unit and a second upper surface portion surrounding an upper portion of the second camera unit, and wherein the first and second upper surface portions may have different thicknesses.

The groove may include a first groove disposed in the first upper surface portion and a second groove disposed in the second upper surface portion, wherein the upper surface portion of the case has the same thickness in a position in which the first groove is located and a position in which the second groove is located.

The case may include a plurality of light-incident holes, wherein the groove is disposed around the plurality of light-incident holes.

The groove may extend in a form of surrounding each light-incident hole.

The groove may have a tetragonal shape.

An adhesive may be disposed in the groove.

The plurality of camera units may have different angles of view.

The plurality of camera units may have different focal lengths.

An electronic device may include the multi-camera module.

In another general aspect, a case for a multi-camera module includes an upper surface portion, a plurality of light incident holes penetrating the upper surface portion configured to accommodate and couple a camera unit in each light incident hole, and a groove disposed in the upper surface portion surrounding one or more light incident holes of the plurality of light incident holes.

The groove may surround each light incident hole, and wherein surrounding one or more light incident holes the groove comprises a different depth than surrounding one or more other light incident holes of the plurality of light incident holes.

A multi-camera module may include the case, and a plurality of camera units disposed in the plurality of light incident holes.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

The present disclosure relates to a multi-camera module 1, which may be applied to a portable electronic device, such as a mobile communication terminal, a smartphone, a tablet PC, and the like. An aspect of the present disclosure is to provide a multi-camera module in which a case is easily detached from a plurality of camera units.

Figure 1:
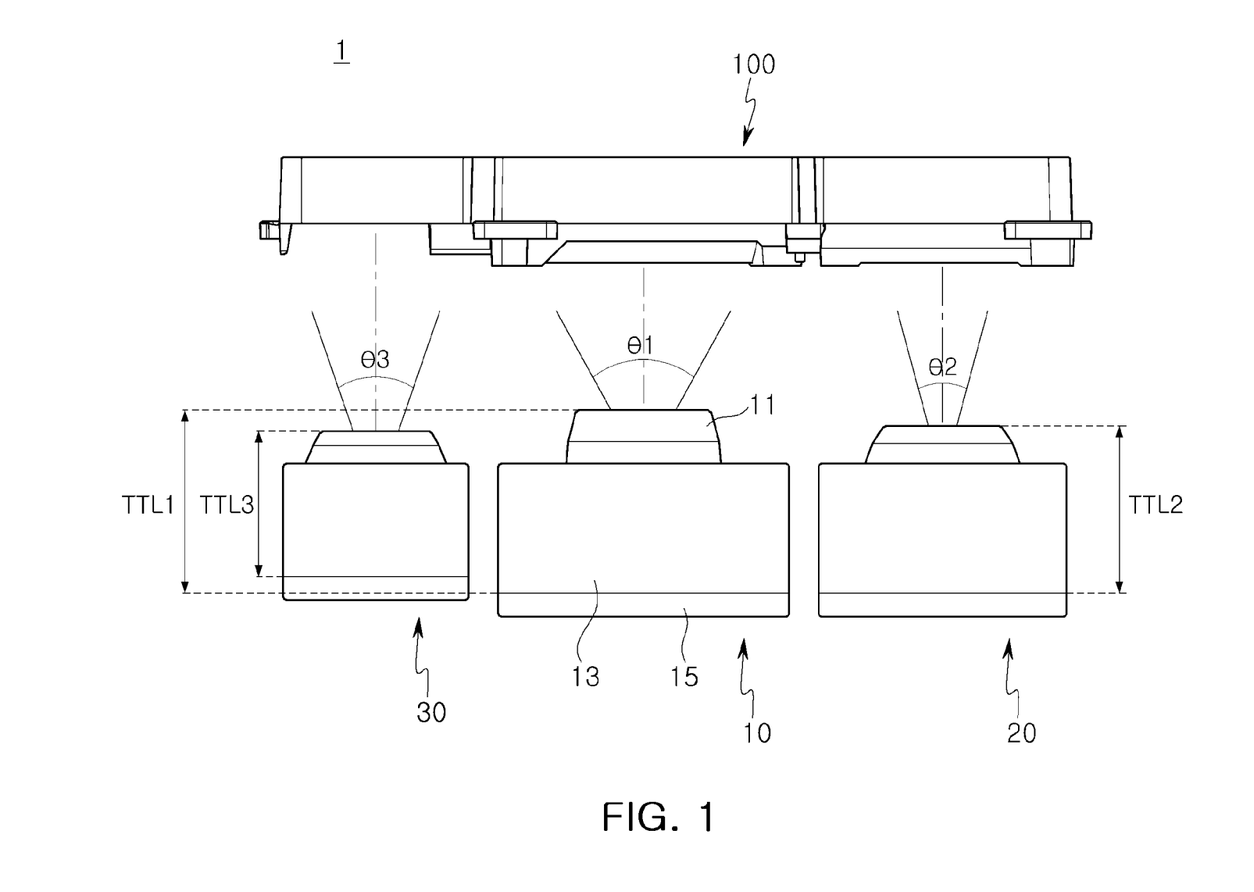
FIG. 1 is an exploded schematic view of a multi-camera module according to one or more example embodiments of the present disclosure.
Figure 2:
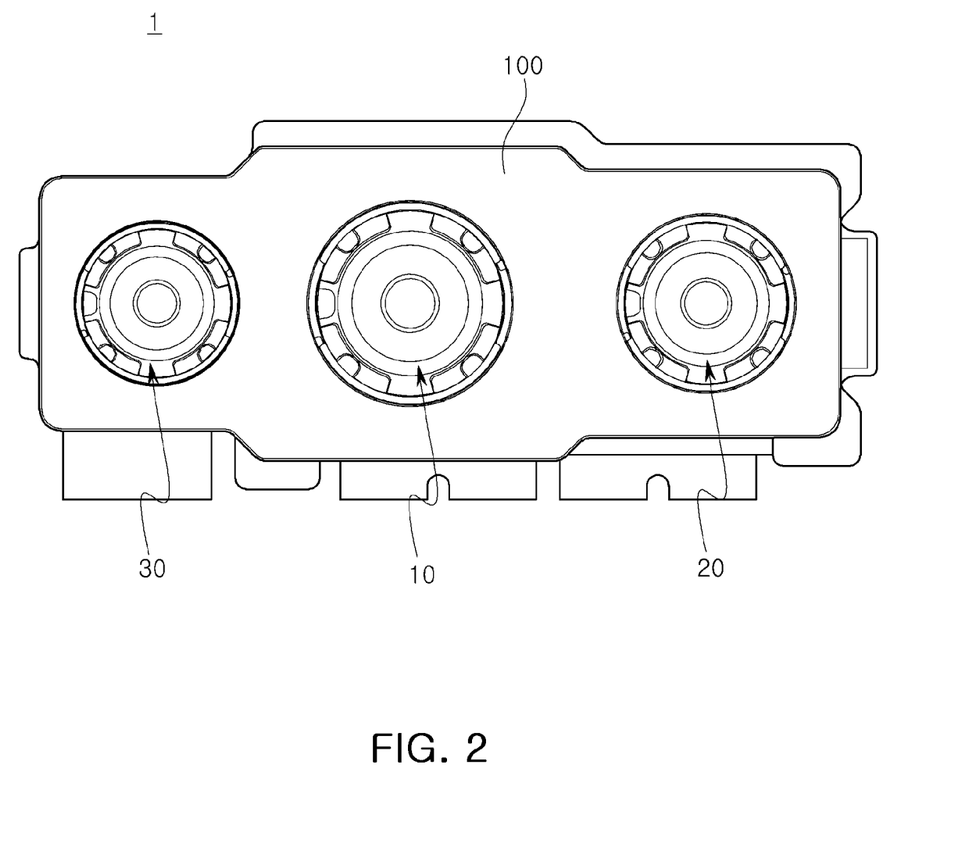
FIG. 2 is a planar view of a multi-camera module according to one or more example embodiments.

FIG. 1 is an exploded schematic view of a multi-camera module according to one or more example embodiments of the present disclosure, and FIG. 2 is a planar view of a multi-camera module according to one or more example embodiments.

Referring to FIGS. 1 and 2, the multi-camera module 1 according to an example embodiment includes a plurality of camera units and a case 100.

The plurality of camera units may refer to two or more camera units. In the example embodiment, the plurality of camera units are described as including a first camera 10, a second camera 20 and a third camera 30. However, the technical concept of the present disclosure should not be limited to the number of the plurality of camera units.

The plurality of camera units may each include a lens module 11, a housing 13 and an image sensor module 15.

The lens module 11 may include at least one lens and is accommodated in the housing 13. Further, the image sensor module 15 may be coupled to the housing 13. The image sensor module 15 may include an image sensor and a printed circuit board to which the image sensor is connected.

At least one camera unit of the plurality of camera units may have a focus adjustment function and/or a shake correction function.

For example, the lens module 11 can adjust a focus by moving in an optical axis direction with respect the housing 13. Alternately, the lens module 11 can adjust a focus by moving in a direction perpendicular to an optical axis with respect to the housing 13 (shake correction function). The term "optical axis direction" may refer to a vertical direction based on FIG. 1.

To this end, at least one camera unit, among the plurality of camera units, may include an actuator for moving a lens module.

The plurality of camera units may be configured to have different angles of view.

As an example, in the case in which the plurality of camera units include two camera units, one of the camera units may have a comparatively wide angle of view (wide angle), while the other camera unit has a comparatively narrow angle of view (telephoto).

As another example, in the case in which the plurality of camera units include three camera units, the first camera unit 10 may have a widest angle of view θ1 (super wide angle), and the second camera unit 20 may have a narrowest angle of view θ2 while the third camera unit 30 may have an angle of view θ3 (standard or wide angle) narrower than the angle of view 81 of the first camera unit 10 and wider than the angle of view θ3 of the second camera unit 20.

By configuring the angles of view of the plurality of camera units to be different from each other, an image of a subject can be captured in different depths.

Further, by covering the plurality of camera units according to an angle of view to be captured, a zoom effect can be substantially achieved.

Meanwhile, the plurality of camera units may have different focal lengths. For example, a focal length TTL1 of the first camera unit 10 may be the greatest, and a focal length TTL3 of the third camera unit 30 may be the smallest, while a focal length TTL2 of the second camera unit 20 may be less than the focal length TTL1 of the first camera unit 10 and greater than the focal length TTL3 of the third camera unit 30.

FIG. 1 illustrates a focal length as a distance between an end of the lens module 11 and the image sensor module 15 for convenience of description; however, the focal length may refer to a distance on an optical axis from a subject side surface of a lens disposed closest to a subject to a capture surface of the image sensor (an image plane).

A case 100 is provided to configure the multi-camera module 1 by connecting the plurality of camera units to each other. The case 100 may be formed of a metal material.

The case 100 is coupled to the plurality of camera units. In the example embodiment, a case coupled to the first camera 10, the second camera 20, and the third camera 30 is provided as a single element, rather than different elements.

That is, a single case 100 is coupled to the plurality of camera units so as to connect the plurality of camera units, independently provided, to each other.

According to an example embodiment, separation of the case 100 may be easily practiced in the multi-camera module 1. For example, an unexpected defect may occur when the multi-camera module 1 is manufactured or in use, thereby requiring a repair. The multi-camera module 1 according to an example embodiment may facilitate the case 100 to be easily separated from the plurality of camera units so as to make a repair thereof feasible.

Figure 3:
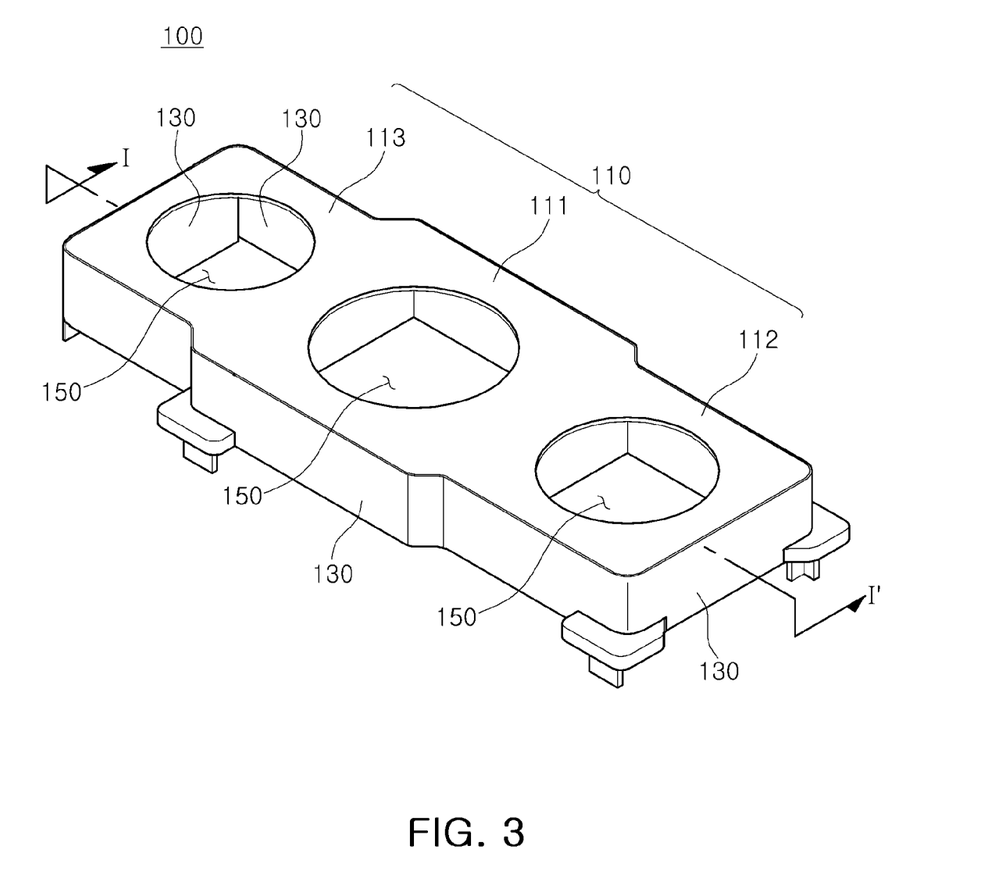
FIG. 3 is a perspective view of a case of a multi-camera module according to one or more example embodiments.
Figure 4:
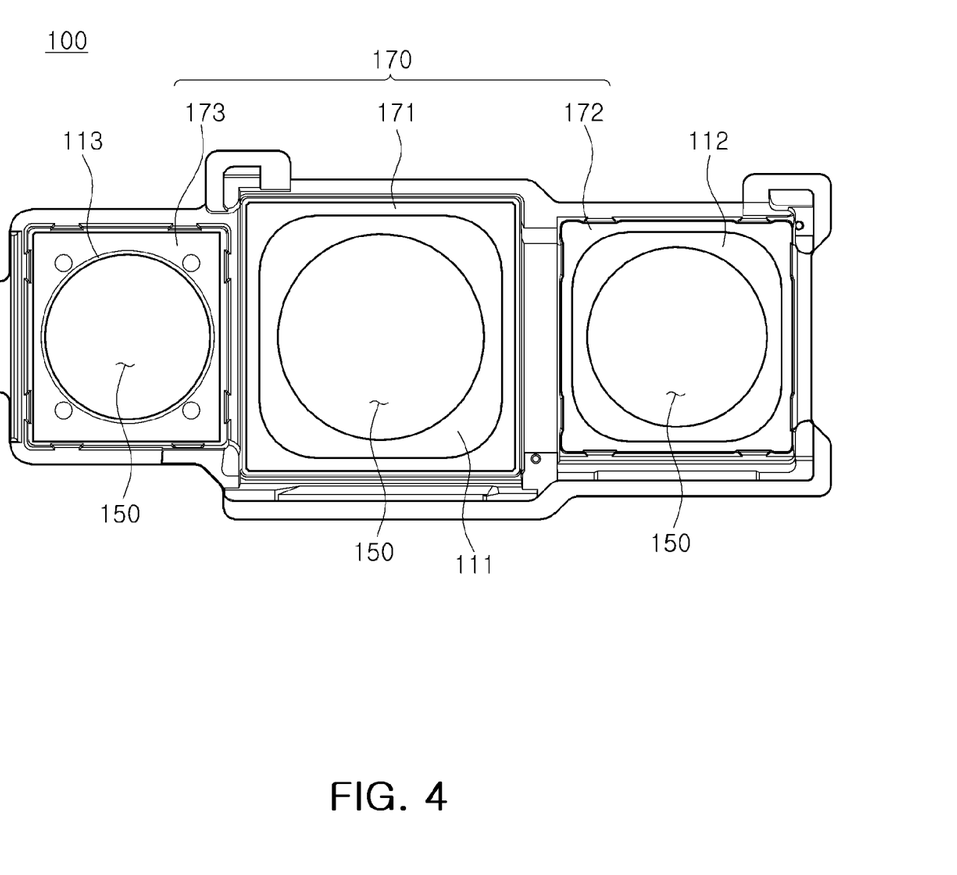
FIG. 4 is a bottom view of a case of a multi-camera module according to one or more example embodiments.
Figure 5:
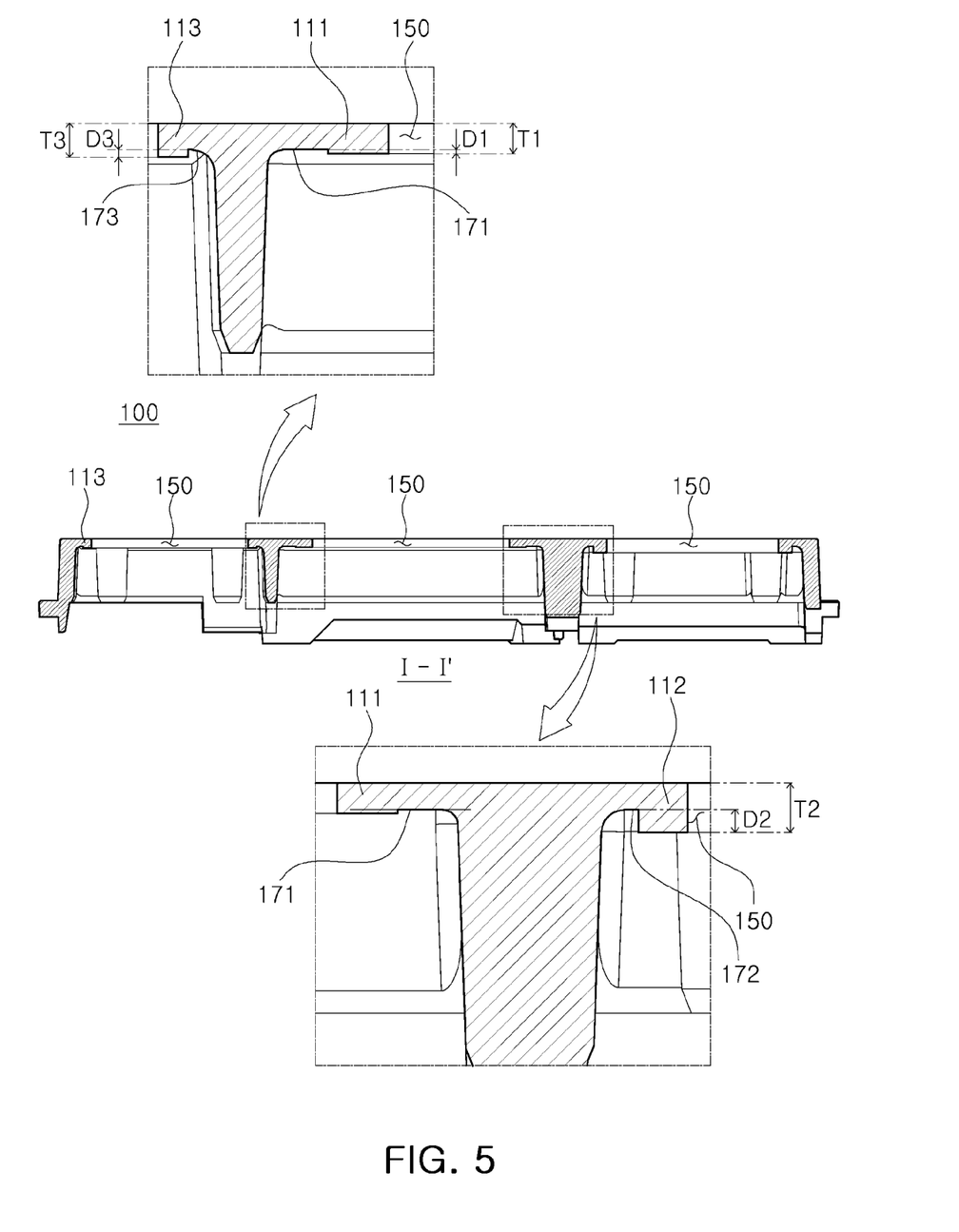
FIG. 5 is a cross-sectional view of I-I' of FIG. 3.

FIG. 3 is a perspective view of a case of a multi-camera module according to one or more example embodiments, and FIG. 4 is a bottom view of a case of a multi-camera module according to one or more example embodiments while FIG. 5 is a cross-sectional view of I-I' of FIG. 3.

Figure 6A:
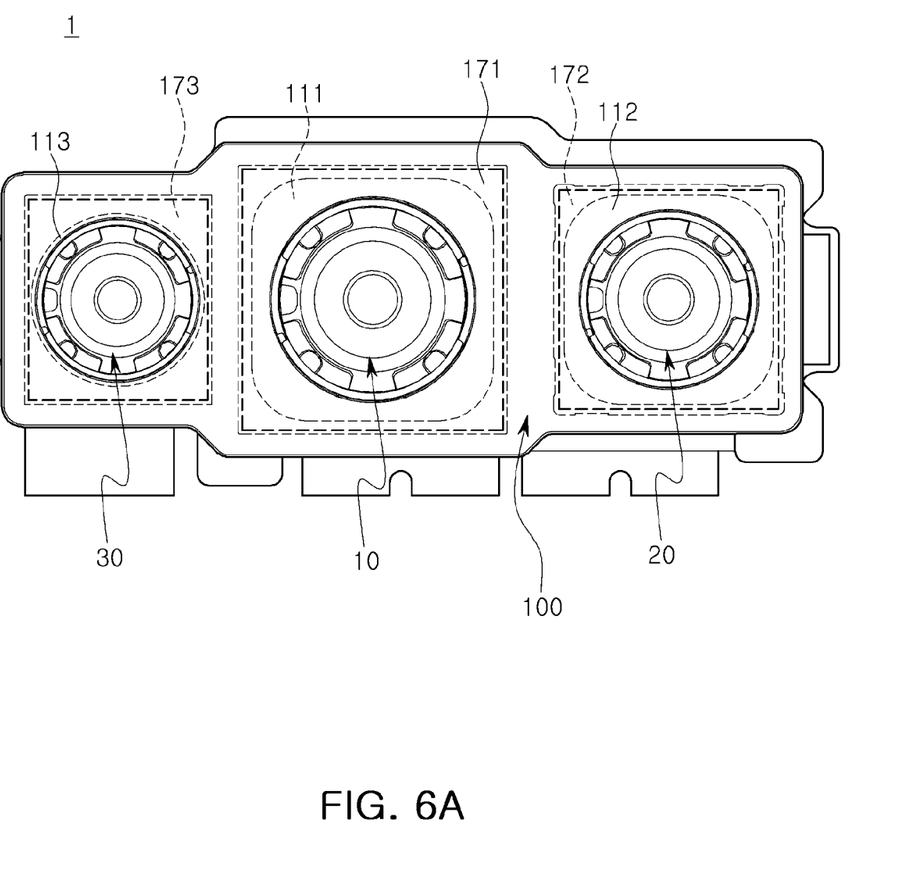
FIGS. 6A and 6B are diagrams illustrating a process of separating a case from a multi-camera module according to one or more example embodiments.
Figure 6B:
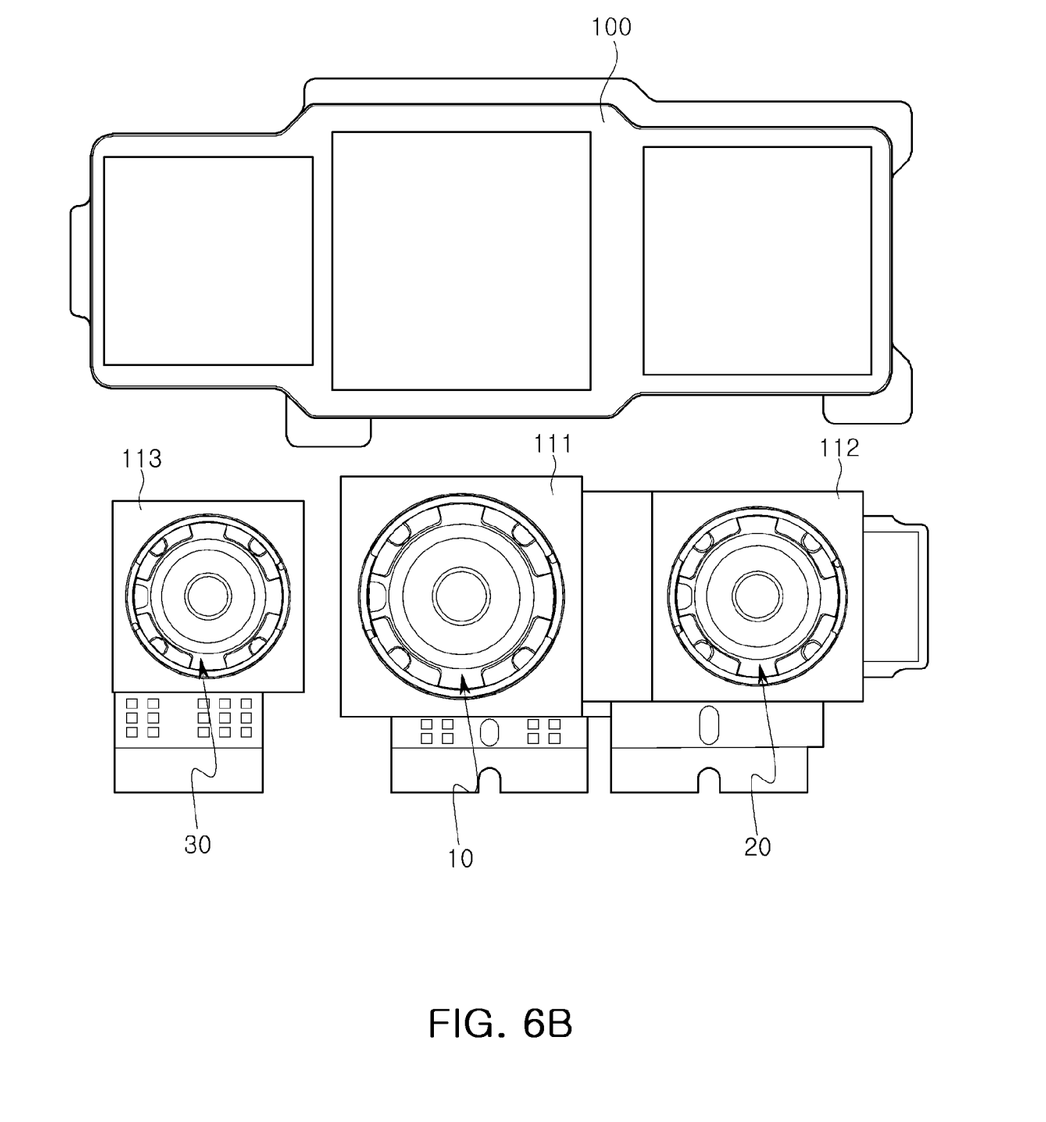

FIGS. 6A and 6B are diagrams illustrating a process of separating a case from a multi-camera module according to one or more example embodiments.

Referring to FIGS. 3 to 6B, the case 100 includes an upper surface portion 110 and a side surface portion 130. The upper surface portion 110 has a tetragonal shape having a thickness in an optical axis direction and may have a shape extending in the optical axis direction from the upper surface portion 110.

While the case 100 is being coupled to the plurality of camera units, the upper surface portion 110 surrounds an upper surface of the plurality of camera units, and the side surface portion 130 surrounds a side surface of the plurality of camera units.

The case 100 is provided with a plurality of light-incident holes 150 corresponding to the camera units. For example, in the case in which the case 100 is coupled to two of the camera units, the case 100 may include two light-incident holes 150. Alternately, in the case in which the case 100 is coupled to three camera units, the case 100 may include three light-incident holes 150.

The plurality of light-incident holes 150 are configured to penetrate the upper surface portion 110 of the case 100. A portion of the lens module of each camera may protrude externally from the light-incident hole 150.

The case 100 is an element connecting the plurality of camera units to each other and thus needs to be firmly coupled to the plurality of camera units. In the case in which the multi-camera module needs a repair, however, separation of the case 100 may be difficult. In this case, a method involving cutting a portion of the case 100 by a laser to separate the case 100 can be considered.

However, the case 100 may have different thicknesses depending on portions corresponding to the camera units. In this case, a problem may arise in that it is difficult to cut the case 100 in a single process.

A portion of the upper surface portion 110 of the case 100 of the multi-camera module 1 according to an example embodiment may be configured to be thinner, as compared to the other portions thereof so as to facilitate easy separation of the case 100 from the plurality of camera units. The thickness refers to a thickness in the optical axis direction.

In this regard, a thin portion of the upper surface portion 110 of the case 100, having a relatively small thickness, is cut by a laser to easily separate the case 100 from the plurality of camera units.

The upper surface portion 110 of the case 100 may be the thinnest in a region around each light-incident hole 150.

A lower surface (a surface facing the camera) of the upper surface portion 110 of the case 100 is provided with a groove 170. The groove 170 may be configured in the form of surrounding each light-incident hole 150.

When viewed in the optical axis direction, the groove 170 may extend to form a tetragonal shape.

Accordingly, a portion of the upper surface portion 110 of the case 100, in which the groove 170 is formed, may have a smaller thickness as compared to the portion in which the groove 170 is not formed.

The groove 170 may be formed around each light-incident hole 150.

In the case of requiring a repair due to a defect generated during a manufacturing process and/or while being used, the portion of the upper surface portion 110 of the case 100, having the small thickness, is cut by a laser, or the like, to easily separate the case 100 from the plurality of camera units, as illustrated in FIGS. 6A and 6B.

For example, referring to FIG. 6A, a portion marked with a thick dotted line-square is a portion in which the groove 170 is located. In this portion, the upper surface portion 110 of the case 100 corresponding to each camera may have a consistently small thickness, such that the portion can be easily cut by a laser, or the like.

The case 100 is an element connecting the plurality of camera units to each other and thus requires a predetermined degree of rigidity. In this regard, the case 100 formed to be entirely thin has low rigidity, thereby deteriorating reliability of the multi-camera module 1. That is, in the case of low rigidity of the case 100, the plurality of camera units may be dislocated or broken due to an impact, or the like.

Accordingly, in the multi-camera module 1 according to an example embodiment, only a portion of the case 100 is formed to be thin so as to secure rigidity of the case 100 and easily separate the case 100 in the instance in which a repair thereof is necessary.

Meanwhile, as the plurality of camera units have different optical performance (angle of views, focal lengths, and the like), locations of lens modules may be different in the optical direction. Accordingly, the thicknesses of the upper surface portion 110 of the case 100, corresponding to the camera units, may be different from each other in the optical axis direction.

For example, referring to FIG. 5, an upper surface of the case 100 corresponding to the first camera 10 (hereinafter, "first upper surface portion" 111) has a smallest thickness T1, and that corresponding to the second camera 20 (hereinafter, "second upper surface portion" 112) has a largest thickness T2 while that corresponding to the third camera 30 (hereinafter, "third upper surface portion" 113) T3 has a thickness larger than the thickness T1 of the first upper surface portion 111 and smaller than the thickness T2 of the second upper surface portion 112.

In this regard, cutting thickness required to separate the case 100 are different depending on the portions of the upper surface portion 110 of the case 100, it may be difficult to easily separate the case 100.

The upper surface portion 110 of the case of the multi-camera module 1 according to an example embodiment has different thicknesses according to portions corresponding to the camera units. In this regard, the groove 170 may have different depths according to locations thereof. That is, the groove 170 may have different depths according to the locations corresponding to the plurality of camera units.

The term "depth" may refer to a depth in the optical axis direction. Meanwhile, in the case in which a bottom surface of the groove 170 is a curved surface, a depth thereof may refer to a greatest depth in the optical axis direction.

For example, the first to third upper surface portions 111 to 113 of the case 100 have different thicknesses. Further, a first groove 171 provided in the first upper surface portion 111, a second groove 172 provided in the second upper surface portion 112 and a third groove 173 provided in the third upper surface portion 113 have different depths.

As an example, a depth D1 of the first groove 171 is smallest, and a depth D2 of the second groove 172 is largest, while a depth D3 of the third groove 173 is larger than the depth D1 of the first groove 171 and smaller than the depth D2 of the second groove 172.

Meanwhile, the upper surface portion 110 of the case 100 may have the same thickness in the position in which the groove 170 is provided.

As an example, T1−D1=T2−D2=T3−D3 can be satisfied.

For example, the thicknesses T1 to T3 of the first to third upper surfaces 111 to 113 are different from each other, and the depths D1 to D3 of the first to third upper surfaces 111 to 113 are different from each other. Accordingly, a thickness of the first upper surface 111 of the region in which the first groove 171 is provided, that of the second upper surface 112 of the region in which the second groove 172 is provided, and that of the third upper surface 113 of the region in which the third groove 173 is provided may have the same thickness.

In this regard, the case 100 can be more easily separated. Meanwhile, the term "same" does not only mean being the same physically, but refers to the presence of tolerances during manufacturing.

Figure 7:
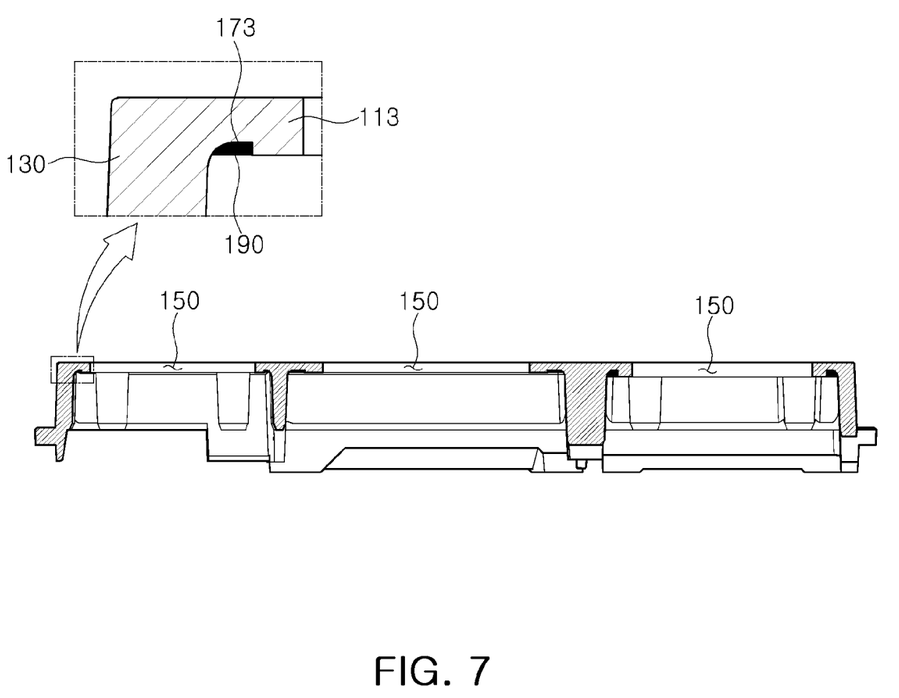
FIG. 7 is a diagram illustrating a modified example of FIG. 5.

FIG. 7 is a diagram illustrating a modified example of FIG. 5.

Referring to FIG. 7, an adhesive 190 may be provided in the groove 170 of the case 100. In this regard, the case 100 can be firmly coupled to each camera through the adhesive 190.

Further, as the adhesive 190 is provided in the groove 170, an application region thereof can be enlarged, thereby improving adhesion of the case 100 to the housing of the case.

Figure 8:
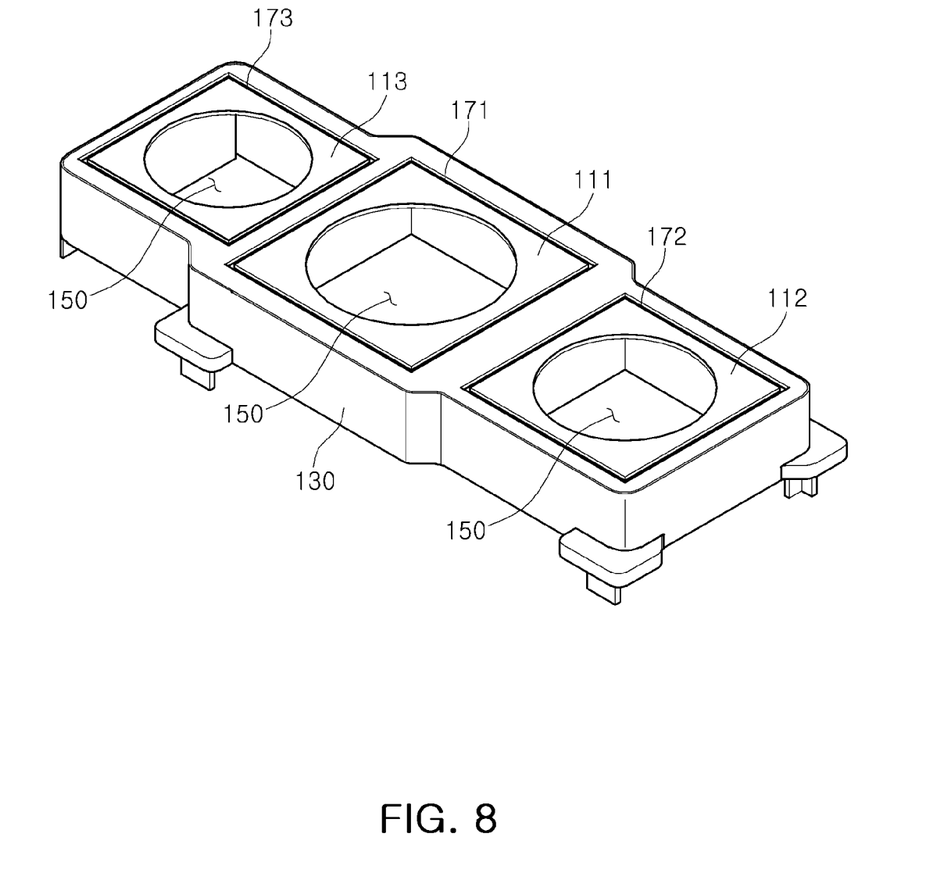
FIG. 8 is a perspective view of a case of a multi-camera module according to one or more other example embodiments.
Figure 9:
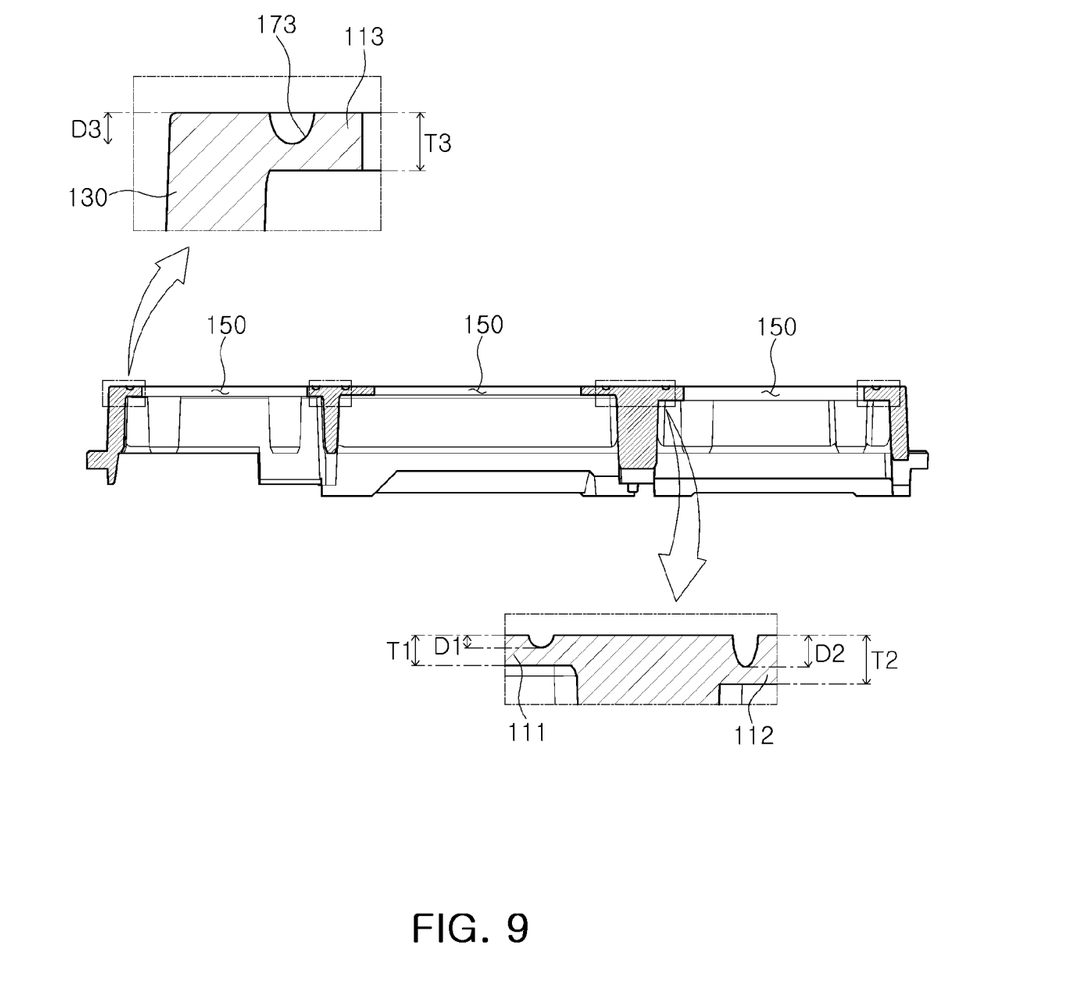
FIG. 9 is a cross-sectional view of FIG. 8.

FIG. 8 is a perspective view of a case of a multi-camera module according to one or more other example embodiments, and FIG. 9 is a cross-sectional view of FIG. 8.

Referring to FIGS. 8 and 9, example embodiments thereof are identical to those illustrated in FIGS. 1 to 6 except the location of the groove 170.

In the example embodiments illustrated in FIGS. 8 and 9, the groove 170 may be provided on an upper surface of the case 100. In this regard, the location of the groove 170 can be easily observed, and separation of the case 100 can be more feasible.

Figure 10:
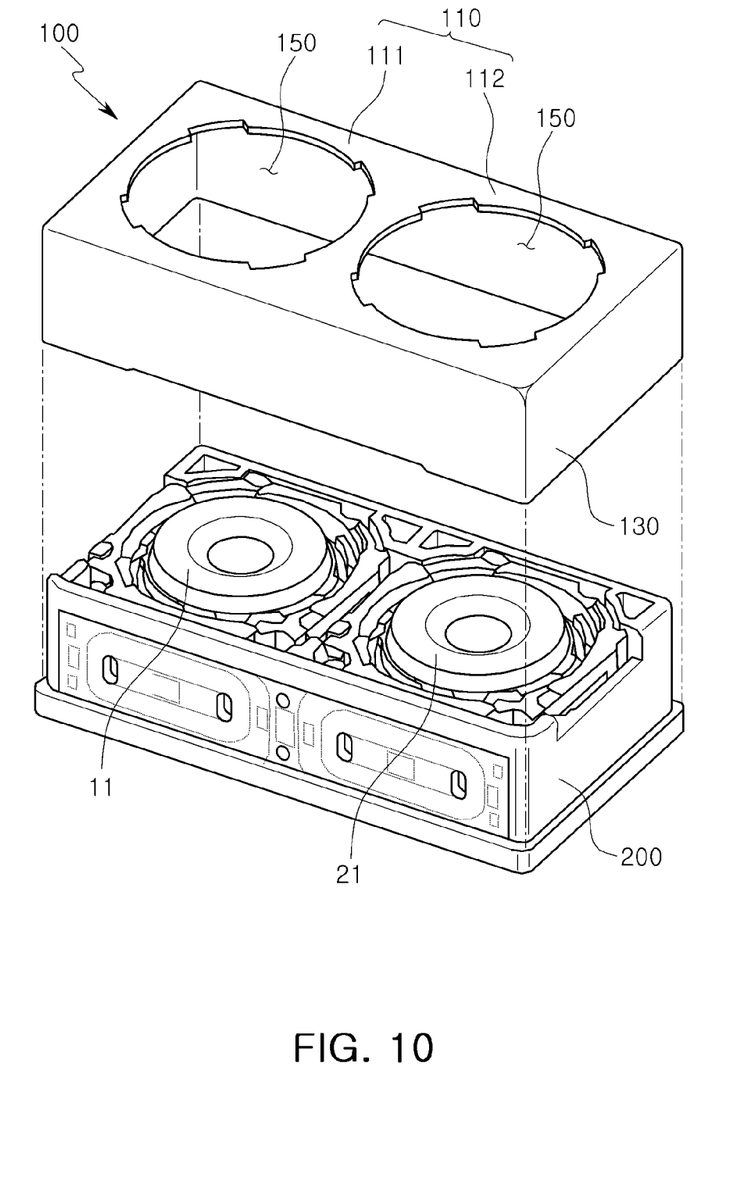
FIG. 10 is a partial exploded perspective view of a multi-camera module according to one or more other example embodiments.
Figure 11:
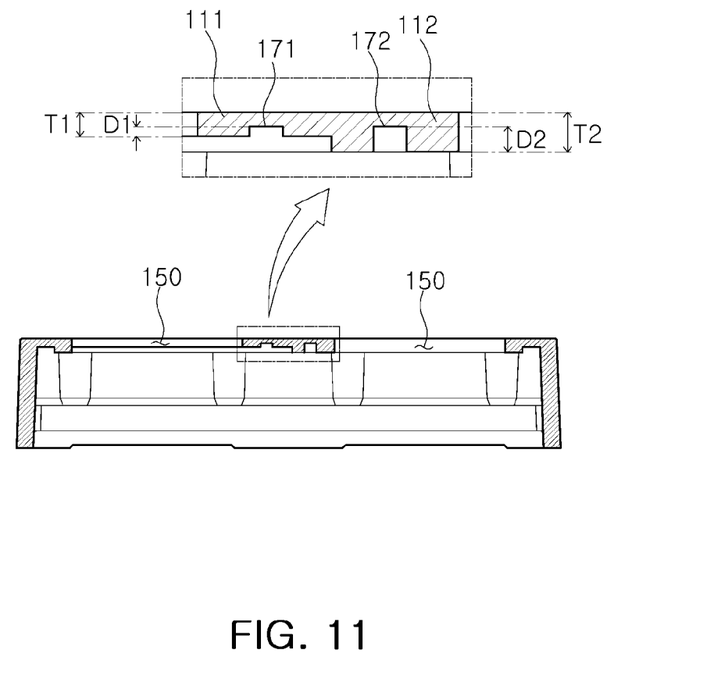
FIG. 11 is a cross-sectional view of a multi-camera module according to one or more other example embodiments.

FIG. 10 is a partial exploded perspective view of a multi-camera module according to one or more other example embodiments, and FIG. 11 is a cross-sectional view of a multi-camera module according to one or more other example embodiments.

Referring to FIGS. 10 and 11, a plurality of camera units include two camera units, and the two camera units are configured as a single module, which is different from the example embodiments described with reference to FIGS. 1 to 9.

For example, in example embodiments illustrated in FIGS. 10 and 11, two lens modules can be accommodated in a single housing 200. For example, the housing 200 may have two accommodation spaces for accommodating a first lens module 11 and a second lens module 21.

In addition, a single case 100 may be coupled to a single housing 200.

As set forth herein, according on example embodiments of the present disclosure, a multi-camera module includes a case easily detachable from a plurality of camera units, and thus, a repair thereof can be easily practiced.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multi-camera module, comprising:
a plurality of camera units; and
a single case coupled to the plurality of camera units,
wherein the case comprises an upper surface portion surrounding an upper portion of the plurality of camera units,
wherein the upper surface portion comprises a groove, the groove having different depths in accordance with a position corresponding to the plurality of camera units, and
wherein the groove extends in a form of surrounding each of the plurality of camera units.

2. The multi-camera module of claim 1, wherein a thickness of the upper surface portion at a position in which the groove is disposed is less than thicknesses of other positions of the upper surface portion.

3. The multi-camera module of claim 2, wherein the upper surface portion has the same thickness at the position in which the groove is disposed.

4. The multi-camera module of claim 1, wherein the groove is located in a lower surface of the upper surface portion.

5. The multi-camera module of claim 1, wherein the groove is located in an upper surface of the upper surface portion.

6. The multi-camera module of claim 1, wherein the plurality of camera units comprise a first camera unit and a second camera unit,
wherein the upper surface portion comprises a first upper surface portion surrounding an upper portion of the first camera unit and a second upper surface portion surrounding an upper portion of the second camera unit, and
wherein the first and second upper surface portions have different thicknesses.

7. The multi-camera module of claim 6, wherein the groove comprises a first groove disposed in the first upper surface portion and a second groove disposed in the second upper surface portion,
wherein the upper surface portion of the case has the same thickness in a position in which the first groove is located and a position in which the second groove is located.

8. The multi-camera module of claim 1, wherein the case comprises a plurality of light-incident holes,
wherein the groove is disposed around the plurality of light-incident holes.

9. The multi-camera module of claim 8, wherein the groove extends in a form of surrounding each light-incident hole.

10. The multi-camera module of claim 9, wherein the groove has a tetragonal shape.

11. The multi-camera module of claim 1, wherein an adhesive is disposed in the groove.

12. The multi-camera module of claim 1, wherein the plurality of camera units have different angles of view.

13. The multi-camera module of claim 1, wherein the plurality of camera units have different focal lengths.

14. An electronic device comprising the multi-camera module of claim 1.

15. A case for a multi-camera module, comprising:
an upper surface portion;
a plurality of light incident holes penetrating the upper surface portion configured to accommodate and couple a camera unit in each light incident hole; and
a groove disposed in the upper surface portion surrounding one or more light incident holes of the plurality of light incident holes,
wherein the groove surrounds each light incident hole, and
wherein surrounding one or more light incident holes the groove comprises a different depth than surrounding one or more other light incident holes of the plurality of light incident holes.

16. The case of claim 15, wherein a thickness of the upper surface portion at a position in which the groove is disposed is less than thicknesses of other positions of the upper surface portion, and
wherein the upper surface portion has the same thickness at the position in which the groove is disposed.

17. The case of claim 15, wherein the groove is located in one or both of a lower surface of the upper surface portion and an upper surface of the upper surface portion.

18. A multi-camera module, comprising
the case of claim 15; and
a plurality of camera units disposed in the plurality of light incident holes.

19. An electronic device comprising the multi-camera module of claim 15.

* * * * *